United States Patent
Kaerner et al.

(10) Patent No.: US 8,626,397 B2
(45) Date of Patent: Jan. 7, 2014

(54) METHOD AND CONTROL DEVICE FOR TRIGGERING A PASSENGER PROTECTION ARRANGEMENT FOR A VEHICLE

(75) Inventors: Christof Kaerner, Albershausen (DE); Josef Kolatschek, Weil der Stadt (DE); Marcus Hiemer, Kehlen (DE)

(73) Assignee: Robert Bosch GmbH, Stuttgart (DE)

( * ) Notice: Subject to any disclaimer, the term of this patent is extended or adjusted under 35 U.S.C. 154(b) by 341 days.

(21) Appl. No.: 12/735,784

(22) PCT Filed: Dec. 1, 2008

(86) PCT No.: PCT/EP2008/066540
§ 371 (c)(1),
(2), (4) Date: Nov. 9, 2010

(87) PCT Pub. No.: WO2009/103373
PCT Pub. Date: Aug. 27, 2009

(65) Prior Publication Data
US 2011/0066334 A1    Mar. 17, 2011

(30) Foreign Application Priority Data
Feb. 19, 2008   (DE) .................... 10 2008 009 906

(51) Int. Cl.
*B60R 22/00*   (2006.01)

(52) U.S. Cl.
USPC .............................................. 701/46; 701/45

(58) Field of Classification Search
USPC ....................................... 701/45–46
See application file for complete search history.

(56) References Cited

U.S. PATENT DOCUMENTS

| 7,675,820 B2 * | 3/2010 | Griffin et al. ............... 367/127 |
| 8,138,900 B2 * | 3/2012 | Mindner et al. ............ 340/436 |
| 2006/0232052 A1 * | 10/2006 | Breed ...................... 280/735 |
| 2006/0235592 A1 * | 10/2006 | Theisen ..................... 701/45 |
| 2008/0259729 A1 * | 10/2008 | Griffin et al. .............. 367/117 |
| 2010/0176866 A1 * | 7/2010 | Fey et al. .................. 327/339 |

FOREIGN PATENT DOCUMENTS

| CN | 1829623 | 9/2006 |
| DE | 10 2005 035 415 | 2/2007 |
| EP | 1 028 039 | 8/2000 |

* cited by examiner

Primary Examiner — Hussein A. Elchanti
(74) Attorney, Agent, or Firm — Kenyon & Kenyon LLP

(57) ABSTRACT

A method and a control device for triggering a passenger protection arrangement for a vehicle are provided, at least one sensor signal from an accident sensor system being provided. A characteristic is derived from this at least one sensor signal, and a flatness is determined from this first characteristic in relation to at least one second characteristic. The crash type is then determined as a function of this flatness. The triggering the passenger protection arrangement (PS) takes place as a function of this crash type.

12 Claims, 2 Drawing Sheets

METHOD AND CONTROL DEVICE FOR TRIGGERING A PASSENGER PROTECTION ARRANGEMENT FOR A VEHICLE

FIELD OF THE INVENTION

The present invention relates to a method and a control device for a triggering a passenger protection arrangement for a vehicle.

BACKGROUND INFORMATION

A method for crash type recognition and a corresponding device for implementing the method is discussed in German patent document DE 10 2005 035 415 A1. The problem of differentiating a so-called AZT crash test and a so-called ODB crash test is already addressed in the above document. An AZT crash test is an Allianz Center for Technology crash test. Such a crash test refers to a crash having a relatively low vehicle speed against a relatively hard barrier. In this test, irreversible restraining devices, for example, airbags or pyrotechnic belt tighteners, must not release. Reversible restraining devices such as crash active headrests, reversible belt tighteners, etc., are permitted to release in such an AZT test. An ODB test is an offset deformable barrier crash test. This test involves the vehicle impacting or contacting an object, the vehicle having a relatively high speed and the object or the barrier being relatively soft. In accordance with the specification, in the event of such an ODB test, it must be ensured that all restraining devices fit for the situation release or ignite, and this also includes irreversible restraining devices.

SUMMARY OF THE INVENTION

In contrast, the method according to the present invention and the control device according to the present invention for triggering a passenger protection arrangement for a vehicle having the features described herein have the advantage that a better differentiation of these two crash types in particular is achieved by evaluating the flatness of a first characteristic derived from the sensor signal in relation to a second characteristic. This function, that is, the evaluation of the flatness, has the advantage that it is insensitive to the differences between simulated and real crash signals. Thus, it becomes easier to utilize a simulation (FEM) of crash signals to obtain information regarding the real crash signals. In particular, it has been shown that the signals that have a characteristic having a flatter curve have a plurality of maxima as a result of a plurality of mechanical events during the crash sequence. These events include deformations of the crash box or a deformation of a longitudinal beam. These events cause acceleration maxima in the sensor signal. However, these maxima will melt into a flatter curve as a function of the crash type and thus also as a function of the crash speed and filtering of the signal. However, signals that do not have such maxima have a less flat curve. Thus, the evaluation of the flatness of the first characteristic makes it possible to achieve a reliable differentiation between such an AZT crash and an ODB crash, in order thereby to achieve a targeted triggering of the passenger protection arrangement.

In the case at hand, a control device is an electric device that processes sensor signals and generates control signals as a function of the evaluation of these sensor signals.

The triggering of a passenger protection arrangement refers to the activation of a passenger protection arrangement such as airbags or belt tighteners. This may refer to a reversible and an irreversible passenger protection arrangement.

The interface may be designed as hardware and/or software. In a hardware design, the interface may be part of an integrated circuit that is used as a system ASIC for the control device, for example. This system ASIC fills a variety of functions for the airbag control device, for example, not only this interface function, but also the function of providing the necessary supply voltages and the function of a safety controller, for example, which constitutes a redundant evaluation path of crash-relevant signals. In a software design, it is a software module that exists, for example, on a processor, such as a microcontroller, as the evaluation circuit. This software module then provides the sensor signal to additional software modules for further processing.

The at least one sensor signal may be a single signal, a preprocessed sensor signal, or also a multiplex of signals. The accident sensor system is normally an acceleration sensor system, for example, an acceleration sensor system disposed centrally in the vehicle, even in the control device itself, for example. Such a centrally disposed acceleration sensor system may also be disposed centrally in a sensor control device or alone, using corresponding construction techniques. However, other sensors are also able to be used as accident sensor systems. This includes acceleration sensors that are located in the periphery of the vehicle, that is, for example, side-impact sensors in the side parts such as the A column, the B column, and the C column, the door sill, or seat lower cross members, structure-borne noise sensors, and also air-pressure sensors. In addition, other accident sensors that are known to one skilled in the art may be used in the case at hand.

The flatness of the at least one first characteristic derived from the sensor signal means that this characteristic's curve is permitted to change only within predefined boundaries in relation to a second characteristic, for example, in a two-dimensional plane or a higher dimensional space. Accordingly, the signal is also to appear phenomenologically flat. As described above, this indicates a crash that causes a plurality of maxima in the acceleration signal, for example, these maxima then melting and thus resulting in a flat curve. The at least one first characteristic may be a filtered acceleration signal, the acceleration signal itself, an integrated acceleration signal, or a signal processed in another way. It is also possible to define a relationship with a reference value. The second characteristic may be the acceleration that is integrated once or twice, if the first characteristic is the filtered acceleration. Then a plane exists that is spanned by the integrated acceleration and the filtered acceleration. In the case at hand, integration is to be understood pragmatically, i.e., a corresponding sum operation, an averaging, etc., may be understood by this. Window integrals and other corresponding methods may also be used. However, the second characteristic may also be the time, for example. That is, the second characteristic is also a function of the crash. It is also possible to determine the crash type, that is, for example, an ODB crash or an AZT crash, on the basis of the flatness. As indicated by the dependent claims, a threshold value decision or also a classification may be used for this purpose.

Passenger protection arrangement are then triggered as a function of this crash type in the above-described manner. That is, as described above, in an ODB crash, an irreversible passenger protection arrangement may also be used.

As illustrated above, the evaluation circuit is a microcontroller or another processor, for example. However, all other possible hardware designs are also possible. In particular, as a processor, the evaluation circuit may have software modules, including, for example, the flatness module for determining a flatness of a first characteristic derived from the at least one sensor signal in relation to the at least one second characteristic, and the crash type module. The triggering module for generating the at least one triggering signal is then also designed as a software module. However, if no processor exists as an embodiment of the evaluation circuit, these modules may also be implemented as hardware. These modules may then also share circuit parts with each other. It is not necessary for these modules to be independent in the case at hand.

The triggering circuit is designed as hardware and/or software, the triggering circuit being able to process the triggering signal, the triggering signal being a function of the crash type. Furthermore, the triggering circuit has electrically controllable power switches that make it possible to trigger passenger protection arrangement by connecting an ignition current, for example.

Advantageous improvements of the method and control device for triggering a passenger protection arrangement for a vehicle recited in the independent claims are rendered possible by the measures and further refinements recited in the dependent claims.

It is advantageous that the flatness is determined in such a manner that the first characteristic's curve moves within predefined boundaries. This means that the curve of the first characteristic is checked in relation to the second characteristic for the changing of the first characteristic's curve.

As indicated above, an acceleration signal, which may be an acceleration signal filtered using a low-pass, may be used as the first characteristic, or a speed reduction that is determined by the integration of the filtered acceleration signal may be used as the second characteristic.

Advantageously, a flatness index is determined from the first characteristic. This flatness index is subjected to a threshold value comparison in order to determine the crash type. The flatness index may also be integrated for the threshold value comparison. The threshold for the threshold value comparison may be designed in an adaptive manner. The threshold value may be modified as a function of the time, the speed reduction (DV) and the forward displacement (DS). In the case at hand, a decision is made to trigger a passenger protection arrangement if the flatness index or the integrated flatness index passes the threshold value comparison. If the flatness index is below this then the triggering of the passenger protection arrangement may be omitted or only the reversible passenger protection arrangement is triggered.

The following algorithms are provided for the flatness index:

1) Flatness index $= cons - \frac{|a\_LP_n - a\_LP_{n-k}|}{1}$, $0 < k < n$

2) Flatness index $= cons - \frac{|a\_LP_n - a\_LP_{n-k}|}{a\_LP_n}$ $0 < k < n$ 3) Flatness index $= \frac{a\_LP_n}{|a\_LP_n - a\_LP_{n-k}|}$, $0 < k < n$ 4) Flatness index $= cons - \frac{|a\_LP_n - a\_LP_{n-k}|}{a\_LP_{n-k}}$, $0 < k < n$ Cons means a constant that is selected according to simulations, a_LP means the low-pass filtered acceleration from the sensor signal, n and k stand for query times. Typically, the signals are queried at a rate of 2 kHz (period duration=½ kHz=0.5 ms). That is, the query times are calculated from $t_n = n \cdot 0.5$ ms.

It is furthermore advantageous that the threshold value decider, into which the flatness index or a variable derived therefrom enters, is designed as software and/or hardware. As illustrated above, the threshold of the threshold value decider may be designed adaptively, so that a control or regulation exists.

Exemplary embodiments of the present invention are illustrated in the drawing and are explained in greater detail in the following description.

DETAILED DESCRIPTION

Figure 1:
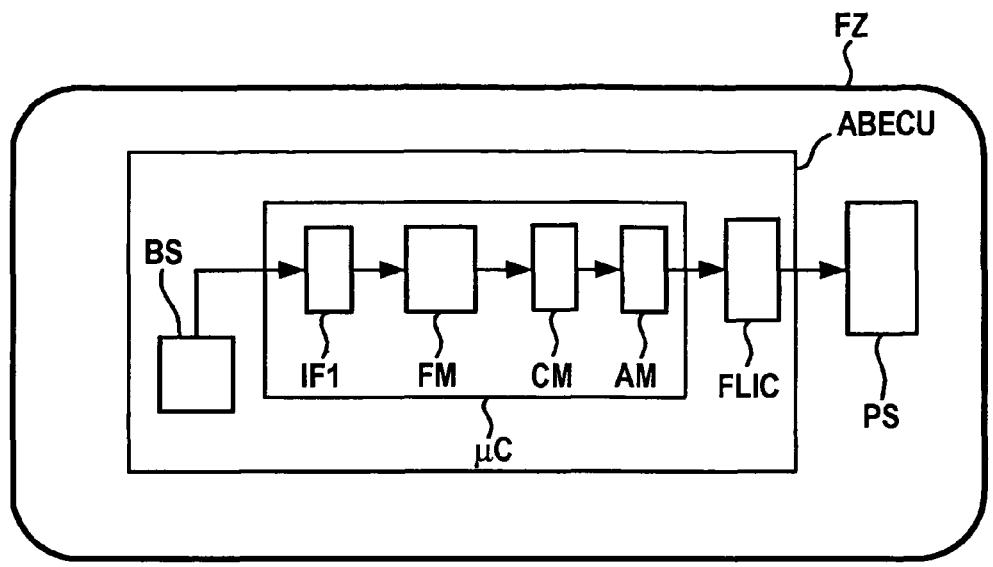
FIG. 1 shows a block diagram of the control device of the present invention.

FIG. 1 illustrates in a block diagram control device ABECU according to the present invention in a vehicle FZ having connected a passenger protection arrangement PS. Airbag control device ABECU has a housing in which its components are located. This housing may be made up of metal and/or plastic. In the case at hand, only the components necessary to gain an understanding of the exemplary embodiments and/or exemplary methods of the present invention are shown. Other components required for operating the control device but not contributing to an understanding of the exemplary embodiments and/or exemplary methods of the present invention have been omitted for the sake of simplicity. However, these components are known to one skilled in the art. This includes, for example, the energy supply or also the design of the redundant hardware path. An acceleration sensor system BS, which senses at least in the vehicle longitudinal direction, provides signals—which may be digital, but alternatively also in an analog manner, to a microcontroller μC, which receives the signals using an interface IF1 as a software module. This interface then provides the signals from sensor system BS to the flatness module. The flatness module provides a low-pass filtering of the acceleration signal if this has not already happened. Furthermore, an integration of the low-pass filtered acceleration signal occurs in the flatness module when this has not occurred already in another manner. Then an investigation of the flatness may occur, namely with the aid of the above-described equations or other indexes that check how flat the signal of the low-pass filtered acceleration is in relation to the speed reduction.

This index is then transmitted to crash type module CM, which uses a threshold value decider or a classification, for example, to check which crash type is described by the flatness index. In the simplest case, in this instance there is only a check to see whether an ODB crash or an AZT crash exists. The crash type then determines the triggering of a passenger protection arrangement PS and is transmitted to triggering module AM, which then generates a corresponding triggering signal for triggering circuit FLIC, the triggering signal indicating whether and which a passenger protection arrangement is to be triggered.

In the case at hand, the method according to the present invention is illustrated in the simplest manner. It is possible for the flatness index, as an input parameter, to enter into a more complex triggering algorithm, which then ultimately decides the triggering, the flatness index constituting only an add-on or a multiplier for a triggering threshold, for example.

Figure 2:
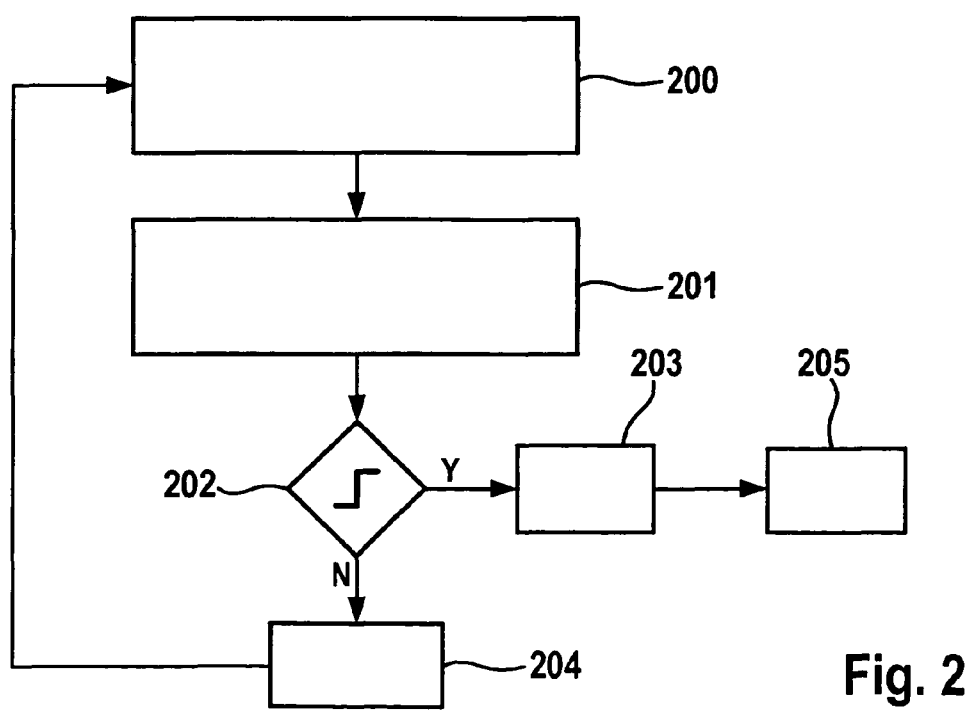
FIG. 2 shows a first flow chart.

FIG. 2 explains the method according to the present invention in a flow chart. The sensor signal, for example, the acceleration signal, is provided and low-pass filtered in method step 200. Furthermore, an integration of the filtered acceleration signal occurs in method step 200 in order to determine the speed reduction. These variables are then used to determine the flatness in method step 201, namely with the aid of one of the above-described equations, for example. This results in the flatness index, which is supplied to a threshold value comparison 202 either in this manner or in an integrated manner. If this variable passes the threshold value comparison, then the crash type for the release is determined in method step 203. Then the triggering occurs in method step 205. If the flatness index or a variable derived therefrom does not pass threshold value comparison 202, then a decision is made for a non-releasing crash type in method step 204, for example, an AZT type, it being possible to trigger a reversible passenger protection arrangement such as belt tighteners, however, for safety reasons, for example. Then, a return is made to method step 200.

Figure 3:
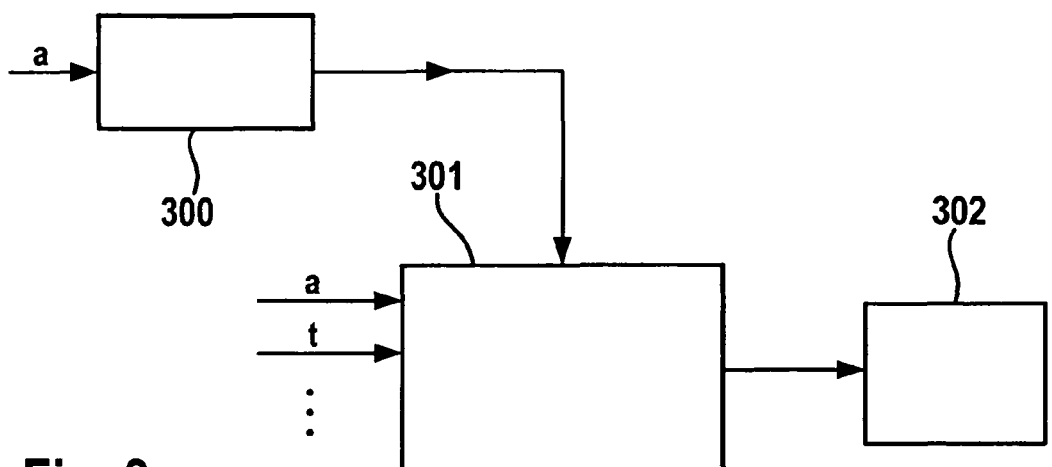
FIG. 3 shows a second flow chart of the method according to the present invention.

FIG. 3 shows a variant of the method according to the present invention in an additional flow chart. In block 300, the crash type is determined in the manner described in FIG. 2, for example, on the basis of the acceleration signal a. This crash type is determined on the basis of the flatness. The crash type then enters into block 301 as an input parameter. Acceleration a and, for example, also the time and possibly additional parameters also enter into this block 301, the triggering algorithm being calculated, in a time-dependent manner or not, in block 301, in order to determine whether and, if so, which passenger protection arrangement is to be triggered. The triggering then takes place accordingly in block 302.

Figure 4:
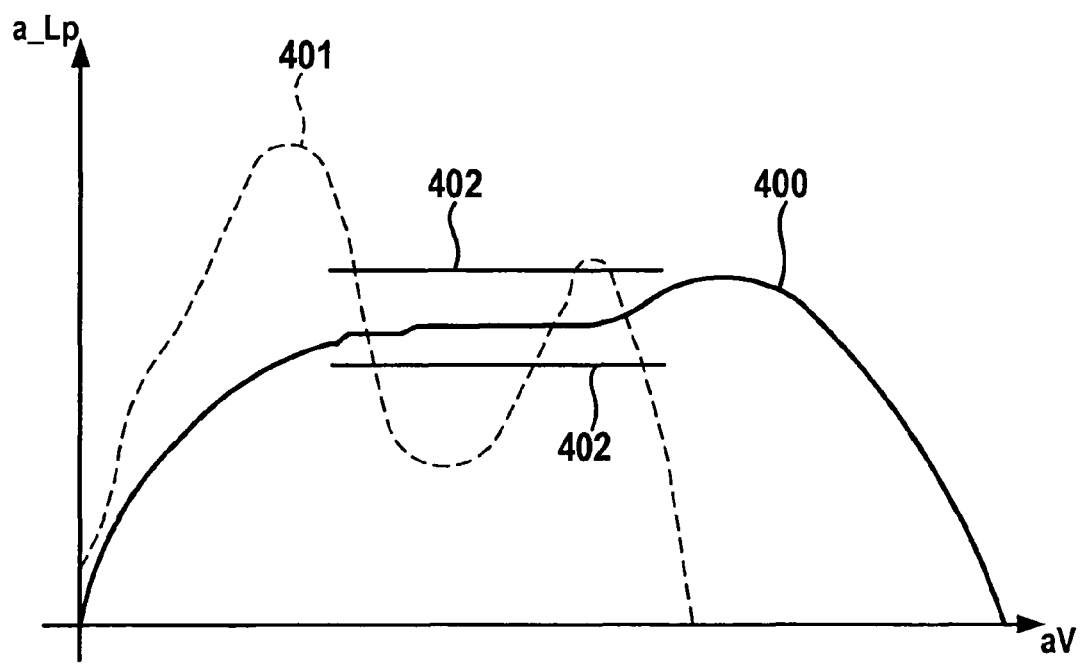
FIG. 4 shows an acceleration speed reduction diagram.

An acceleration speed reduction diagram is illustrated in FIG. 4. In the case at hand, two crash types are illustrated, to with, a release crash 400, for example, an ODB crash, and a non-releasing crash 401, which is illustrated using a dashed line, the so-called AZT crash, for example. Boundary lines 402 describe the flatness of signal 400. Within a specific section, signal 400 is not permitted to move above boundaries 402; otherwise, the flatness is not provided. This may be refined accordingly.

What is claimed is:

1. A method for triggering a passenger protection arrangement for a vehicle, the method comprising:
   receiving, by a hardware circuit, at least one sensor signal from an accident sensor system;
   determining, by the hardware circuit, a flatness of a first characteristic derived from the at least one sensor signal in relation to at least one second characteristic;
   determining, by the hardware circuit, a crash type as a function of the flatness; and
   triggering, by the hardware circuit, the passenger protection arrangement as a function of the crash type.

2. The method of claim 1, wherein the flatness is determined so that a curve of the first characteristic moves within predefined boundaries.

3. The method of claim 1, wherein an acceleration signal is used as the first characteristic and a speed reduction is used as the second characteristic.

4. The method of claim 1, wherein a flatness index is determined from the first characteristic, and the flatness index is subjected to a threshold value comparison to determine the crash type.

5. The method of claim 4, wherein the flatness index is integrated for the threshold value comparison.

6. The method of claim 4, wherein a threshold for the threshold value comparison is configured in an adaptive manner.

7. The method of claim 1, wherein the first characteristic is generated through a low-pass filtering of the at least one sensor signal.

8. The method of claim 4, wherein if the flatness index passes the threshold value comparison, then the crash type that leads to the triggering of the passenger protection arrangement is determined.

9. The method of claim 1, wherein the determining of the flatness includes determining a rate of change of a curve formed by a plurality of values of the at least one sensor signal.

10. The method of claim 1, wherein the hardware circuit includes a computer processor.

11. A control device for triggering a passenger protection arrangement for a vehicle, comprising:
    an interface for providing at least one sensor signal from an accident sensor system;
    an evaluation circuit having a flatness module for determining a flatness of a first characteristic derived from the at least one sensor signal in relation to at least one second characteristic, a crash type module for determining a crash type as a function of the flatness, and a triggering module for generating a triggering signal as a function of the crash type; and
    a triggering circuit for triggering the passenger protection arrangement as a function of the crash type.

12. The control device of claim 11, wherein the flatness module determines a flatness index from the first characteristic for determining the flatness, and wherein a threshold value decider is provided in the crash type module for the flatness index.

* * * * *

UNITED STATES PATENT AND TRADEMARK OFFICE
CERTIFICATE OF CORRECTION

PATENT NO. : 8,626,397 B2  Page 1 of 1
APPLICATION NO. : 12/735784
DATED : January 7, 2014
INVENTOR(S) : Kaerner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this

Twenty-second Day of September, 2015

Michelle K. Lee
*Director of the United States Patent and Trademark Office*